United States Patent
Hoffmann et al.

(10) Patent No.: US 10,640,105 B2
(45) Date of Patent: May 5, 2020

(54) METHOD FOR OPERATING AN ENERGY MANAGEMENT SYSTEM AND ENERGY MANAGEMENT SYSTEM

(71) Applicants: HYUNDAI MOTOR COMPANY, Seoul (KR); KIA MOTORS CORPORATION, Seoul (KR)

(72) Inventors: Stefan Hoffmann, Russelsheim (DE); Carlos Mazzetti, Russelsheim (DE)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 205 days.

(21) Appl. No.: 15/974,024

(22) Filed: May 8, 2018

(65) Prior Publication Data
US 2019/0118795 A1 Apr. 25, 2019

(30) Foreign Application Priority Data
Oct. 24, 2017 (DE) .................. 10 2017 218 903

(51) Int. Cl.
| | |
|---|---|
| *B60L 9/00* | (2019.01) |
| *B60W 20/19* | (2016.01) |
| *B60W 20/13* | (2016.01) |
| *B60W 10/26* | (2006.01) |
| *H02J 7/14* | (2006.01) |

(52) U.S. Cl.
CPC ............ *B60W 20/19* (2016.01); *B60W 10/26* (2013.01); *B60W 20/13* (2016.01); *H02J 7/1446* (2013.01)

(58) Field of Classification Search
CPC combination set(s) only.
See application file for complete search history.

(56) References Cited

U.S. PATENT DOCUMENTS

| | | | |
|---|---|---|---|
| 9,045,131 B2 | 6/2015 | Fuchtner | |
| 2001/0024104 A1* | 9/2001 | Suzuki | ...................... B60K 6/48 |
| | | | 320/104 |
| 2008/0133076 A1* | 6/2008 | Formanski | ............ B60W 10/26 |
| | | | 701/22 |

* cited by examiner

*Primary Examiner* — Adam M Alharbi
(74) *Attorney, Agent, or Firm* — Brinks Gilson & Lione

(57) ABSTRACT

The present disclosure provides methods for operating an energy management system for a traction battery of a hybrid electric vehicle. In one implementation, a method may include: determining whether a state of charge of the traction battery is below a predetermined charge level; when the state of charge is below the predetermined charge level, and when the energy management system identifies an intent of a driver to overtake another vehicle based on a first data set and identifies an unsafe overtaking condition based on a second data set, generating a charge request for charging the traction battery to at least the predetermined charge level.

12 Claims, 3 Drawing Sheets

METHOD FOR OPERATING AN ENERGY MANAGEMENT SYSTEM AND ENERGY MANAGEMENT SYSTEM

CROSS-REFERENCE TO RELATED APPLICATION

Figure 1:
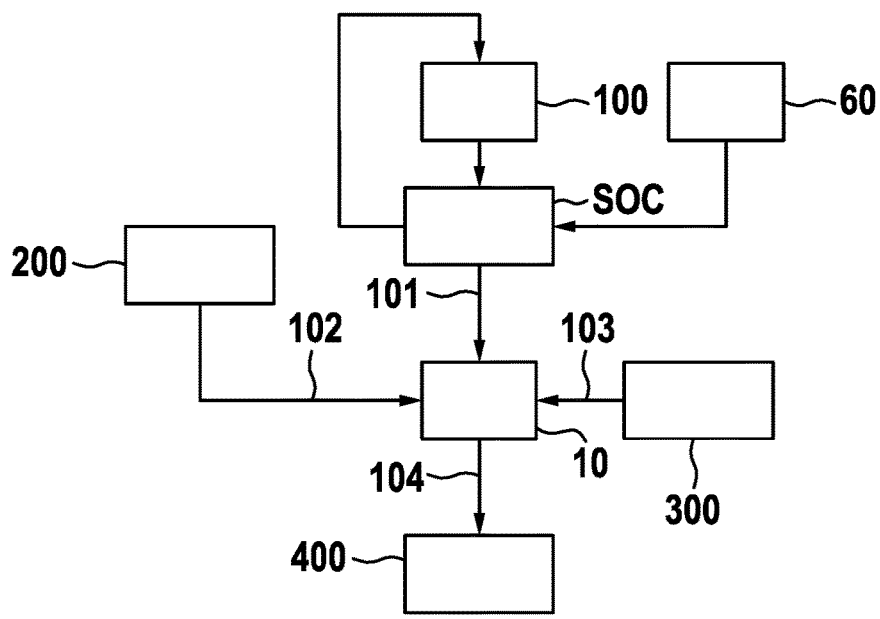

The present application claims priority to and the benefit of German Patent Application No. 102017218903.7, filed on Oct. 24, 2017, which is incorporated herein by reference in its entirety.

FIELD

The present disclosure relates to a method for operating an energy management system for a traction battery of a hybrid electric vehicle and to an energy management system for a traction battery of a hybrid electric vehicle.

BACKGROUND

The statements in this section merely provide background information related to the present disclosure and may not constitute prior art.

During a vehicle overtaking maneuver, such as when one vehicle passes another vehicle, it is desired that a maximum power of a propulsion system of a vehicle is available at the wheels, especially while driving on highways. This improves a reliability and safety of the maneuver.

Within the scope of hybrid electric vehicles, an electric machine can aid an internal combustion engine during overtaking maneuvers by supplying additional electric boost to the vehicle propulsion system.

The performance of the electric machine is, however, highly dependent on the vehicle battery state of charge and there is currently no intelligent energy management system on the market that ensures that the electric machine operates under its optimal conditions during vehicle overtaking.

U.S. Pat. No. 9,045,131 B1 discloses a method and a device for controlling a drive train of a hybrid electric vehicle, which can be driven by an internal combustion engine, respectively individually or together with an electric machine, which includes an electrical energy store, power electronics and a motor/generator unit.

Depending on a first or second position of an operator control, the drive train is operated in a first operating mode corresponding to a boost preparatory phase or in a second operating mode corresponding to a boost phase.

In the first operating mode, the electrical energy store is charged by operating the motor/generator unit, as a generator, and in the second operating mode, a boost function of the electric machine is called by operating the motor/generator unit, together with the internal combustion engine, as a motor.

Furthermore, the operator control may include a pressure switch, in particular a pushbutton knob, wherein the first operating mode is called by pressing the operator control a first time, and wherein the second operating mode is called by pressing the operator control a further time.

Consequently, it is desired that the state-of-the-art energy management strategies be improved.

SUMMARY

An aspect of the present disclosure relates to a method for operating an energy management system for a traction battery of a hybrid electric vehicle.

The method includes determining whether a state of charge of the traction battery is below a predetermined charge level.

Furthermore, the method includes when the state of charge is below the predetermined charge level, and when the energy management system identifies an intent of a driver to overtake another vehicle based on a first data set and identifies an unsafe overtaking condition based on a second data set, generating a charge request for charging the traction battery to at least the predetermined charge level.

A further aspect of the present disclosure relates to an energy management system for a traction battery of a hybrid electric vehicle.

The energy management system may be configured to determine whether a state of charge of the traction battery is below a predetermined charge level.

Furthermore, the energy management system is configured to generate a charge request for charging the traction battery to at least the predetermined charge level when an intent of a driver to overtake another vehicle based on a first data set is identified and when an unsafe overtaking condition based on a second data set is identified.

A further aspect of the present disclosure relates to an automobile, preferably a hybrid electric vehicle, having a traction battery and an energy management system in some forms of the present disclosure.

The idea of the present disclosure is to improve the state-of-the-art energy management strategies via a so-called automated boost preparation method. The automated boost preparation method is capable of charging the traction battery of the hybrid electric vehicle in advance to overtaking maneuvers by relying on prediction strategies implemented by the energy management system that aids the electric machine to operate in its best possible efficiency range.

This leads to a more robust assistance to the internal combustion engine, which may increase the safety of vehicle passengers.

By making the generation of a charge request conditional upon the intent of a driver to overtake another vehicle based on a certain predefined set of parameters and in addition an unsafe overtaking condition based on a further set of predefined parameters, an overtaking efficiency as well as the passenger safety can be enhanced.

In some forms of the present disclosure, the first data set includes data from sensors installed on the vehicle and data from vehicle-to-everything (V2X) communication or data from a vehicle global positioning system (GPS) and a digital map, and wherein the second data set includes data from V2X communication, or data from V2X communication and data from a vehicle GPS and a digital map.

By using data from sensors installed on the vehicle and data from V2X communication or data from a vehicle GPS and a digital map, the intent of the driver to overtake another vehicle can be accurately identified by the energy management system.

The energy management system may include e.g. a hybrid control unit, an engine control unit or a vehicle controller, wherein the determinations/calculations performed by the energy management system are understood to be performed by one or several of the hybrid control unit, the engine control unit or the vehicle controller.

Furthermore, by using data from V2X communication, or data from V2X communication and data from a vehicle GPS and a digital map, an unsafe overtaking condition can be accurately identified by the energy management system.

In some forms of the present disclosure, the intent of the driver to overtake another vehicle is identified by the energy management system by processing data from a wheel speed sensor in order to determine a current vehicle speed $V_{REF}$, and by determining the speed of the vehicle driving ahead by receiving data via V2X communication, wherein the intent of the driver to overtake is determined when the current vehicle speed $V_{REF}$ is higher than the speed of the vehicle driving ahead or if a relative vehicle speed calculated from the current vehicle speed and the speed of the vehicle driving ahead is greater than or equal to a predetermined threshold value.

By taking into account the fact that a vehicle is driving ahead at a given speed as well as the speed of the current vehicle, an intent to overtake the other vehicle can be accurately determined.

In some forms of the present disclosure, the energy management system may additionally determine a duration during which the current vehicle speed is higher than the speed of the vehicle driving ahead or during which the relative vehicle speed is greater than or equal to the predetermined threshold value and/or determines a distance of the current vehicle to the vehicle driving ahead, wherein the intent of the driver to overtake another vehicle is identified by the energy management system when the current vehicle speed is higher than the speed of the vehicle driving ahead or the relative vehicle speed is greater than or equal to the predetermined threshold value for at least a predetermined amount of time, or the distance of the current vehicle to the vehicle driving ahead is lower than a predetermined value.

By additionally taking into account the duration during which the current vehicle speed is higher than the speed of the vehicle driving ahead and/or the distance of the current vehicle to the vehicle driving ahead, the intent of the driver to overtake another vehicle can be determined even more accurately.

In some forms of the present disclosure, the intent of the driver to overtake another vehicle may be identified by the energy management system by comparing a mapped pattern of a typical vehicle speed for different roadways including urban roadways, rural roadways and highways, said pattern being mapped under clear road conditions in which no vehicle driving ahead is detected by V2X communication, with a current vehicle speed, wherein when the current vehicle speed is lower than the mapped pattern of the typical vehicle speed by a predefined value and when a vehicle driving ahead is detected by V2X communication, the intent of the driver to overtake another vehicle is determined.

Accordingly, if it is determined by the energy management system that an actual speed of the current vehicle is lower than a previously mapped pattern of a typical vehicle speed in different roadways conditions, it can be accurately determined by the energy management system that a driver intends to overtake another vehicle.

In some forms of the present disclosure, an unsafe overtaking condition may be identified by the energy management system by determining when a vehicle is driving ahead by receiving data via V2X communication, and by analyzing a roadway profile by receiving data from the GPS and the digital map, preferably also data via V2X communication on oncoming traffic, for identifying places in which overtaking maneuvers are unsafe.

By using this information, the driver of the current vehicle can benefit e.g. from the roadway information that is available by means of the GPS and the digital map to determine a suitable overtaking section.

In some forms of the present disclosure, an unsafe overtaking condition for a section of the roadway profile may be identified by the energy management system when the section of the roadway profile has a curve radius of less than 500 m or if a ratio of the curve radius (R) to the current vehicle speed is less than a predetermined value.

This information is particularly helpful in cases in which e.g. there is no information available via V2X communication on oncoming traffic. However, irrespective of any data received via V2X communication, it may be possible to identify a safe/unsafe overtaking condition by taking into account a curve radius of a specific section of the roadway profile, possibly also in combination with a current vehicle speed.

In some forms of the present disclosure, an unsafe overtaking condition may be identified by the energy management system by processing data received via V2X communication, said data including at least one of data on oncoming traffic, data on a current traffic congestion ahead, weather warning data, data on road accidents ahead, data on broken down vehicles ahead or data on road works ahead.

Consequently, when at least one of the aforementioned data is provided via V2X communication, it can be determined that an unsafe overtaking condition may exist.

In some forms of the present disclosure, the energy management system may identify an unsafe overtaking condition when at least one of data on oncoming traffic, data on a current traffic congestion ahead, weather warning data, data on road accidents ahead, data on broken down vehicles ahead or data on road works ahead is received via V2X communication.

By taking into account the aforementioned parameters, a passenger safety can be greatly improved with the data provided via V2X communication in order to determine a safe/unsafe overtaking condition.

In some forms of the present disclosure, the traction battery may be charged to at least the predetermined charge level during operation of the hybrid electric vehicle by operating an electric machine as a generator for providing a predefined power output of the electric machine, and wherein the predetermined charge level of the traction battery is 80%.

In doing so, the state of charge of the traction battery can always be held at an optimal value, i.e. above 80% in order to maintain a maximum power of the propulsion system at the wheels when an overtaking maneuver is carried out by the driver.

The described features of the method of operating an energy management system for a traction battery of a hybrid electric vehicle are also disclosed in the energy management system for the traction battery of the hybrid electric vehicle, the automobile and vice versa.

In some forms of the present disclosure, if an unsafe overtaking condition is identified by the energy management system a message is displayed to the driver in the hybrid electric vehicle. Thus, not only the battery is pre-charged to enable better overtaking performance, but the driver is also notified of an ideal timing for initiating an overtaking maneuver.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 1, 2, 3, 4, and 5 show flowcharts of methods for operating an energy management system for a traction battery of a hybrid electric vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a flowchart of a method for operating an energy management system for a traction battery of a hybrid electric vehicle in some forms of the present disclosure.

At 100, the energy management system checks the state of charge of the traction battery of the hybrid electric vehicle. In order to determine whether the state of charge of the traction battery meets certain criteria, i.e. whether the state of charge of the traction battery is above a predefined threshold value, preferably 80% of a total capacity of the traction battery, the battery management system compares a value supplied by a battery management system 60 with the stored predefined threshold value of e.g. 80%.

If it is determined by the energy management system 10 that the state of charge of the traction battery is currently above 80% the process returns to 100. If, by contrast, it is determined 101 that the state of charge of the traction battery is currently below 80%, the process continues to further take into account the condition if a driver wish 200 to overtake another vehicle is identified 102 and condition if an unsafe overtaking condition 300 is identified 103 by the energy management system 10.

If it is determined by the energy management system 10 that all of the above conditions are met, i.e. the state of charge of the traction battery is below 80% of its maximum capacity, a driver wish 200 to overtake another vehicle is identified and an unsafe overtaking condition 300 is not identified, the energy management system 10 then generates 104 a charge request 400 for charging the traction battery to at least the predetermined charge level of 80% of its maximum capacity.

Figure 2:
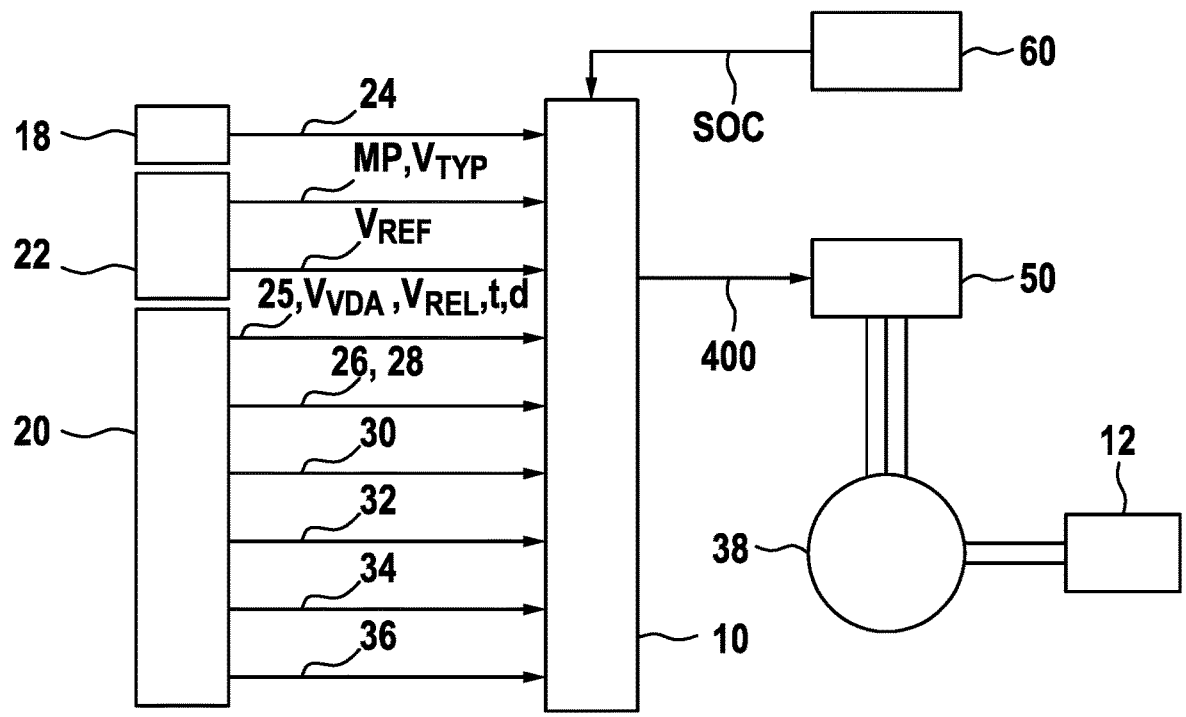

FIG. 2 shows a flowchart of a method for operating an energy management system for the traction battery of the hybrid electric vehicle in some forms of the present disclosure.

The energy management system 10 is adapted to receive multiple inputs. Said multiple inputs comprise data from sensors 18 installed on the vehicle, data from V2X communication 20 and data from a vehicle GPS and a digital map 22.

Furthermore, the energy management system 10 is adapted to receive data concerning a battery state of charge SOC from the battery management system 60. Moreover, the energy management system 10 is adapted to generate a charge request 400 for charging the traction battery 12 to said predetermined charge level, said charge request being sent from the energy management system 10 to an electric motor control unit 50 that controls an electric machine 38 that in turn is connected to the traction battery 12.

The sensors 18 installed on the vehicle include a wheel speed sensor 24. The vehicle GPS and digital map 22 is adapted to provide the energy management system 10 with data concerning a current vehicle location and a roadway profile to be described in more detail later.

The V2X communication 20 can e.g. be implemented by a V2X communication system integrated into the energy management system 10 or alternatively be provided as an external system.

The V2X communication includes a vehicle detection 25, a speed of the vehicle driving ahead $V_{VDA}$, a relative vehicle speed $V_{REL}$, a duration t during which the current vehicle speed $V_{REF}$ is higher than the vehicle speed $V_{VDA}$ of the vehicle driving ahead or during which the relative vehicle speed $V_{REL}$ is greater than or equal to the predetermined threshold value and additionally a distance d of the present vehicle to the vehicle driving ahead.

The V2X communication 20 may further include data on oncoming traffic 26, data on a current traffic congestion ahead 28, weather warning data 30, data on road accidents ahead 32, data on broken down vehicles ahead 34 and data on road works ahead 36.

Figure 3:
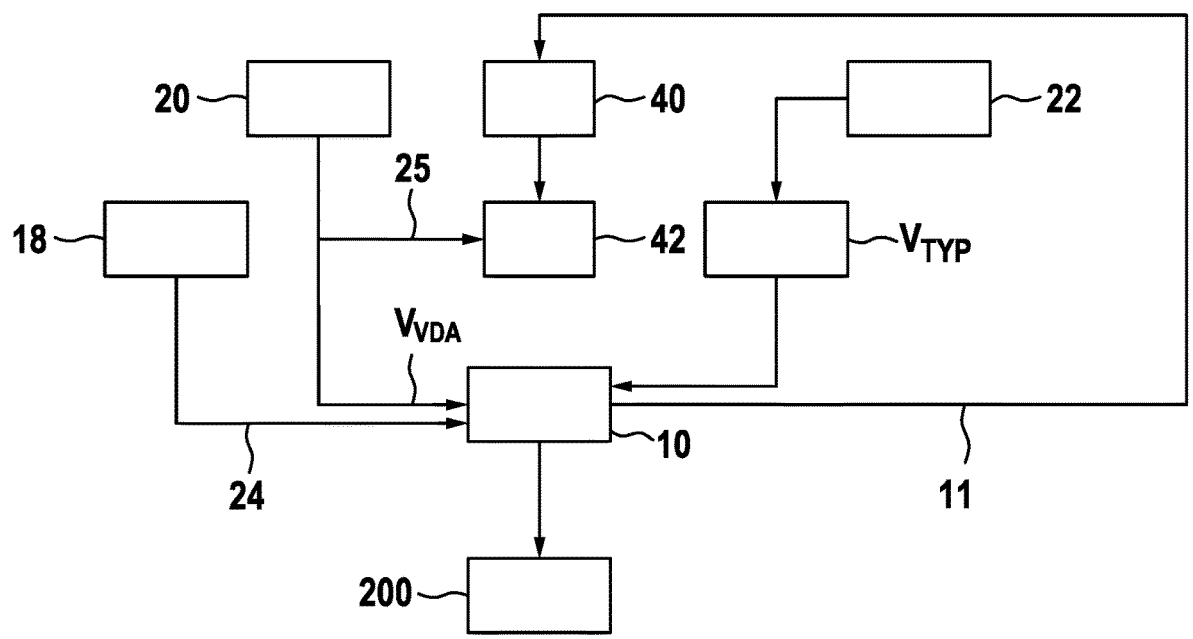

FIG. 3 shows a flowchart of a method for operating an energy management system for the traction battery of the hybrid electric vehicle in some forms of the present disclosure.

At 40, the process starts to determine if there is a vehicle driving ahead of the present vehicle. This is determined at 20 by V2X communication. If it is determined by the energy management system 10 that no vehicle is driving ahead, then additional data from the vehicle GPS system and the digital map 22 is taken into account in order to determine if a vehicle is in fact driving ahead of the present vehicle in the case where e.g. no V2X communication is available.

In this case, energy management system 10 compares a mapped pattern MP of a typical vehicle speed $V_{typ}$ for different roadways comprising urban roadways, rural roadways and highways, said pattern being mapped under clear road conditions in which no vehicle driving ahead is detected by V2X communication, with a current vehicle speed $V_{REF}$, wherein if the current vehicle speed $V_{REF}$ is lower than the mapped pattern MP of the typical vehicle speed $V_{typ}$ by a predefined value, it can also be determined by the energy management system 10 by means of the aforementioned data acquired from the GPS system and the digital map 22 that a vehicle is driving ahead of the present vehicle.

By contrast, if it is determined by V2X communication that a vehicle is driving ahead of the present vehicle, the speed $V_{VDA}$ of the vehicle driving ahead is provided by V2X communication 20 to the energy management system 10.

Furthermore, vehicle sensor information 18 by means of the wheel speed sensor 24 is provided to the energy management system 10. The battery management system 10 then identifies based on the data provided by V2X communication 20 and the vehicle GPS system and the digital map 22 if a relative vehicle speed $V_{REL}$ is greater than zero. Alternatively, the energy management system 10 identifies based on the data provided by the sensors 18 installed on the vehicle and data provided by the vehicle GPS system and the digital map 22 if a current vehicle speed $V_{REF}$ of the present vehicle is smaller than a typical vehicle speed $V_{typ}$ based on the mapped pattern mapped by the vehicle GPS system and the digital map 22.

If the energy management system 10 identifies that either the relative vehicle speed $V_{REF}$ is greater than zero or alternatively that the current vehicle speed $V_{REF}$ of the present vehicle is smaller than the typical vehicle speed $V_{typ}$ based on the mapped pattern mapped by the vehicle GPS system and digital map 22, the energy management system 10 identifies the driver wish 200 to overtake another vehicle. If the above mentioned conditions are identified to be false by the energy management system 10 then the process continues at 11 to proceed back to the start 40.

Figure 4:
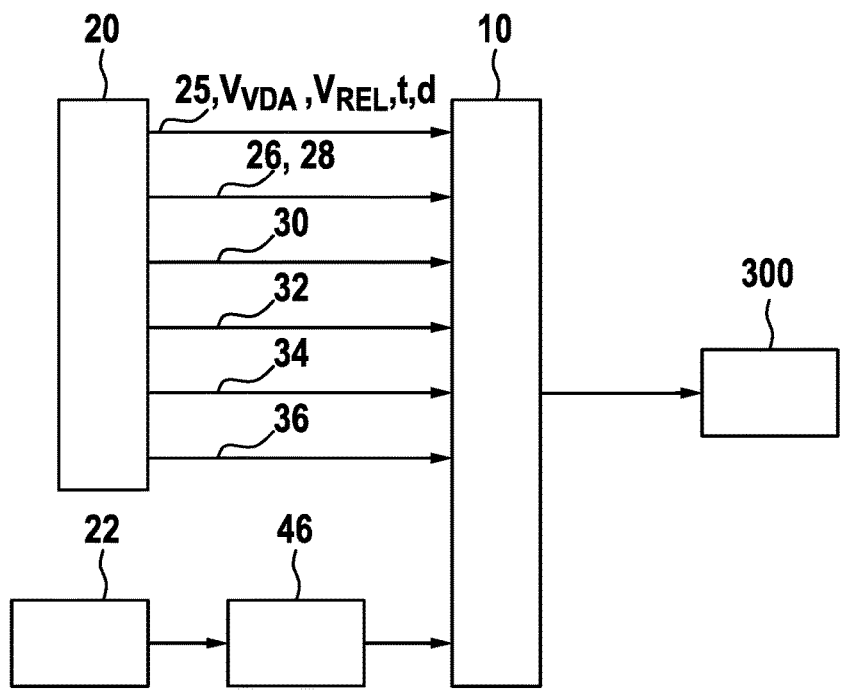

FIG. 4 shows a flowchart of the method for operating an energy management system for the traction battery of the hybrid electric vehicle in some forms of the present disclosure.

In order to identify an unsafe overtaking condition 300 the energy management system 10 takes into account data provided by V2X communication as well as data provided by the vehicle GPS and the digital map 22.

To this end, the energy management system 10 processes V2X communication 20 that include at least one of data on identifying a vehicle driving ahead 25, the speed $V_{VDA}$ of the vehicle driving ahead, a relative vehicle speed $V_{REL}$, a duration t during which the current vehicle speed $V_{REF}$ is higher than the speed $V_{VDA}$ of the vehicle driving ahead and a distance d of the present vehicle to the vehicle driving ahead.

Moreover, said V2X communication 20 may further include data on oncoming traffic 26, data on a current traffic congestion ahead 28, weather warning data 30, data on road accidents ahead 32, data on broken down vehicles ahead 34 and data on road works ahead 36.

In addition, the data supplied by the GPS and the digital map 22 includes data concerning a curve radius of a specific a section of the roadway profile. At 46 it is determined if the curve radius R of the specific section of the roadway profile is smaller than 500 m.

Alternatively, it can be determined if a ratio of the curve radius R to the current vehicle speed $V_{REF}$ is lower than a predetermined value, thus making it possible to determine an unsafe overtaking condition as a function of both the current vehicle speed $V_{REF}$ and the curve radius R.

If the energy management system 10 determines that any one of the above-mentioned conditions are true, i.e. if any of the data provided by V2X communication 20 or the data provided by the GPS and a digital map indicates an unsafe overtaking condition, that is if any V2X communication data is provided to the energy management system 10 or if it is determined at 46 that the curve radius of the specific section of the roadway profile is smaller than 500 m then the energy management system 10 identifies that an unsafe overtaking condition exists.

Figure 5:
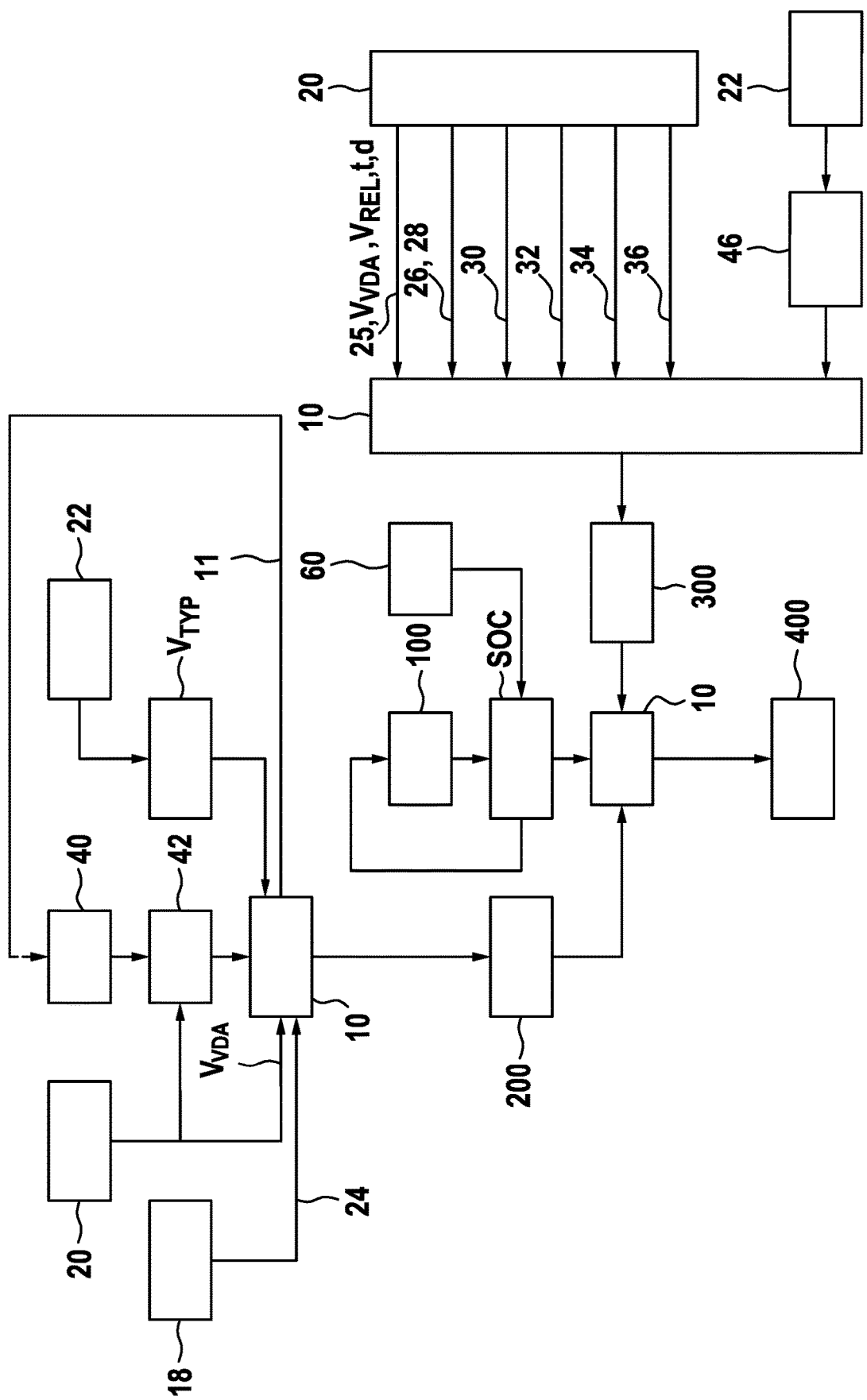

FIG. 5 shows a flowchart of a method for operating an energy management system for the traction battery of the hybrid electric vehicle in some forms of the present disclosure.

In FIG. 5, the aforementioned flowcharts shown in FIGS. 1, 3 and 4 are shown in one diagram. As can be seen, the energy management system 10 identifies that a driver wish 200 to overtake another vehicle is present based on data provided by sensors 18 installed on the vehicle, V2X communication or data from a vehicle GPS and a digital map 22.

The energy management system 10 is furthermore adapted to identify an unsafe overtaking condition 300 based on data provided by V2X communication 20 and data from a vehicle GPS and a digital map 22.

If it is determined that the state of charge SOC of the traction battery is below the predetermined charge level and in addition the battery management system 10 identifies both a driver wish 200 to overtake another vehicle and an unsafe overtaking condition 300 does not exist then the battery management system 10 generates the charge request 400.

Although the aforementioned method for operating an energy management system for a traction battery of a hybrid electric vehicle and the corresponding energy management system 10 for a traction battery of said hybrid electric vehicle have been described in connection with automobiles, a person skilled in the art is aware of the fact that the herein described energy management system can of course be applied to other objects that include an electric machine and an internal combustion engine.

The description of the disclosure is merely exemplary in nature and, thus, variations that do not depart from the substance of the disclosure are intended to be within the scope of the disclosure. Such variations are not to be regarded as a departure from the spirit and scope of the disclosure.

DESCRIPTION OF SYMBOLS

1 Automobile
10 energy management system
11 return to start
12 traction battery
14 first set of data
16 second set of data
18 sensors installed on the hybrid electric vehicle
20 V2X communication
22 GPS and digital map
24 wheel sensors
25 detection of vehicle
26 oncoming traffic
28 traffic congestion ahead
30 weather warning data
32 data on road accidents ahead
34 data on broken down vehicles ahead
36 data on road works ahead
38 electric machine
40 start
42 vehicle detected ahead
50 electric motor control unit
60 battery management system
46 curve radius smaller than 500 m
100 start
101 step
102 step
103 step
104 step
200 intent of a driver to overtake another vehicle
300 unsafe overtaking condition
400 charge request
d distance
MP mapped pattern
R curve radius
SOC state of charge
t timespan
$V_{REF}$ speed of current vehicle
$V_{REL}$ relative speed
$V_{typ}$ typical vehicle speed
$V_{VDA}$ speed of forward vehicle

What is claimed is:

1. A method for operating an energy management system for a traction battery of a hybrid electric vehicle, the method comprising:

determining whether a state of charge of the traction battery is below a predetermined charge level;
determining a speed of a current vehicle ($V_{ref}$) based on data received from a wheel speed sensor;
determining a speed of a forward vehicle ($V_{vda}$) based on data received from the V2X communication;
determining that the driver intends to overtake another vehicle when the $V_{ref}$ is higher than the $V_{vda}$ or a relative vehicle speed ($V_{rel}$) that is calculated from the $V_{ref}$ and the $V_{vda}$ is greater than or equal to a predetermined threshold value; and
when the state of charge is below the predetermined charge level, and when the energy management system identifies an intent of a driver to overtake another vehicle based on a first data set and identifies an unsafe overtaking condition based on a second data set, generating a charge request for charging the traction battery to at least the predetermined charge level.

2. The method of claim 1, wherein the first data set comprises:
data received from sensors installed on the hybrid electric vehicle;
data received from vehicle-to-everything (V2X) communication; and
data received from a vehicle global positioning system (GPS) and a digital map, wherein the second data set comprises:
data received from the V2X communication; and
data received from the vehicle GPS and the digital map.

3. The method of claim 1, further comprising:
determining, with the energy management system, a duration that the $V_{REF}$ is higher than the $V_{VDA}$ or that the $V_{REL}$ is greater than or equal to the predetermined threshold value;
determining, with the energy management system, a distance of the current vehicle from the forward vehicle; and
determining that the driver intends to overtake another vehicle when the $V_{REF}$ is higher than the $V_{VDA}$, the $V_{REL}$ is greater than or equal to the predetermined threshold value for at least a predetermined amount of time, or the distance of the current vehicle to the forward vehicle is less than a predetermined value.

4. The method of claim 2, wherein identifying the intent of the driver to overtake another vehicle comprises:
comparing a mapped pattern of a typical vehicle speed ($V_{TYP}$) for different roadways with the $V_{REF}$, wherein the mapped pattern is mapped under clear road conditions when the V2X communication does not detects the forward vehicle; and
determining that the driver intends to overtake another vehicle when the $V_{REF}$ is lower than the $V_{TYP}$ by a predetermined value and when the V2X communication detects the forward vehicle.

5. The method of claim 2, wherein identifying the unsafe overtaking condition comprises:
detecting the forward vehicle based on data received from the V2X communication; and
analyzing a roadway profile based on data received from the GPS and the digital map, wherein data regarding oncoming traffic is received from the V2X communication that is configured to identify places that overtaking maneuvers are unsafe.

6. The method of claim 5, further comprising:
determining, with the energy management system, that a section of the roadway profile is the unsafe overtaking condition when the section of the roadway profile has a curve radius of less than 500 m or a ratio of the curve radius to the $V_{REF}$ is less than a predetermined value.

7. The method of claim 2, wherein identifying the unsafe overtaking condition comprises:
processing unsafe overtaking data received from the V2X communication, wherein the unsafe overtaking data comprises at least one of:
data on oncoming traffic;
data on a current traffic congestion ahead;
weather warning data;
data on road accidents ahead;
data on broken down vehicles ahead; or
data on road works ahead.

8. The method of claim 7, further comprising:
determining, with the energy management system, that the overtaking condition is unsafe when the unsafe overtaking data is received from the V2X communication.

9. The method of claim 1 further comprising:
charging, with an electric machine, the traction battery to at least the predetermined charge level during operation of the hybrid electric vehicle, wherein the electric machine is configured to provide a predefined power output of the electric machine, and the predetermined charge level is 80 percentage (%).

10. The method of claim 1, further comprising:
when the energy management system identifies the unsafe overtaking condition, transmitting a message to the driver of the hybrid electric vehicle.

11. An energy management system for a traction battery of a hybrid electric vehicle having a control unit, the system to direct the control unit to perform acts of:
determining when a state of charge of the traction battery is below a predetermined charge level;
determining whether a state of charge of the traction battery is below a predetermined charge level;
determining a speed of a current vehicle ($V_{ref}$) based on data received from a wheel speed sensor;
determining a speed of a forward vehicle ($V_{vda}$) based on data received from the V2X communication;
determining that the driver intends to overtake another vehicle when the $V_{ref}$ is higher than the $V_{vda}$ or a relative vehicle speed ($V_{rel}$) that is calculated from the $V_{ref}$ and the $V_{vda}$ is greater than or equal to a predetermined threshold value; and
generating a charge request for charging the traction battery to at least the predetermined charge level when an intent of a driver to overtake another vehicle based on a first data set is identified and an unsafe overtaking condition based on a second data set is identified.

12. An automobile including a hybrid electric vehicle, having a traction battery and an energy management system with a control unit, wherein the energy management system is configured to direct the control unit to perform acts of:
determining whether a state of charge of the traction battery is below a predetermined charge level;
determining whether a state of charge of the traction battery is below a predetermined charge level;
determining a speed of a current vehicle ($V_{ref}$) based on data received from a wheel speed sensor;
determining a speed of a forward vehicle ($V_{vda}$) based on data received from the V2X communication;
determining that the driver intends to overtake another vehicle when the $V_{ref}$ is higher than the $V_{vda}$ or a relative vehicle speed ($V_{rel}$) that is calculated from the $V_{ref}$ and the $V_{vda}$ is greater than or equal to a predetermined threshold value; and and when the state of charge is below the predetermined charge level, and when the energy management system identifies an intent of a driver to overtake another vehicle based on a first data set and identifies an unsafe overtaking condition based on a second data set, generating a charge request for charging the traction battery to at least the predetermined charge level.

\* \* \* \* \*